United States Patent Office 3,370,955
Patented Feb. 27, 1968

3,370,955
PROCESS FOR MAKING ACIDIFIED
DAIRY PRODUCTS
Lawrence L. Little, Creve Coeur, Mo., assignor to The Battelle Development Corporation, Columbus, Ohio, a corporation of Delaware
No Drawing. Continuation-in-part of application Ser. No. 347,034, Feb. 24, 1964. This application Apr. 13, 1966, Ser. No. 542,216
1 Claim. (Cl. 99—54)

ABSTRACT OF THE DISCLOSURE

A direct-acid process for coagulating cream in the production of noncultured sour cream which comprises adding from 0.05 to 1.00 percent, by weight, of a colloid former as an acid stabilizer and from .25 to 2.00 percent, by weight, of at least one material selected from the group of caseinates, lecithin, and monodiglycerides of unsaturated fatty acids as homogeneity stabilizers to cream, pasteurizing and homogenizing, and thereafter adding an edible acid to said cream sufficient to bring about coagulation.

---

This application is a continuation-in-part of my United States patent application Ser. No. 347,034, filed Feb. 24, 1964, entitled, "Process for Making Acidified Dairy Products," now abandoned, which was, in turn, a continuation-in-part of my U.S. patent application Ser. No. 173,833, filed Feb 16, 1962, now abandoned, which was, in turn, a continuation-in-part of my U.S. patent application Ser. No. 104,233, filed April 20, 1961, now abandoned.

This invention relates to improvements in the preparation of sour cream by the direct-acid process and relates particularly to a novel process for making a better textured sour-cream product by utilizing homogeneity stabilizers as well as acid stabilizers prior to coagulation.

As is set forth in my aforementioned copending patent applications, in the preparation of sour milk products by the direct-acid addition process, it is necessary to stabilize the milk base prior to the acid addition. Acids added directly to a milk base in concentrations to avoid undue dilution at ordinary temperatures, cause uneven casein coagulation and result in an unmarketable product. To stabilize the milk base against uneven coagulation in accordance with the aforementioned patent application, hydrophilic colloid-forming vegetable gums are added to the milk base prior to the acid addition.

In the production of sour-cream products, such as party dips, where the acid stabilizers were added to cream, in addition to providing a more desirable coagulation such additions also contribute to a firm body. The latter effect is of particular significance since consumers demand sour cream with a firm, plastic body. However, when vegetable gums are used at sufficiently high levels to provide a desired thickness to the cream, a stringy textured product results which is undesirable.

Body producing adducts, such as tapioca starch, may be employed in conjunction with the acid stabilizers to produce a more desirable firm, short-textured plastic bodied sour-cream product. However, the use of adducts, such as starch, in amounts over about one percent results in a heavy, gummy-type body which is undesirable.

Consumers demand sour cream products which have a firm, plastic (nonstringy) body that cannot be attained in the direct-acid process by the use of acid stabilizers alone.

The most effective factor by far in developing the desired body is to increase the surface of the fat globules resulting from effective homogenization. When one considers that homogenization increases the surface area of the fat globules up to a hundredfold or more, and that the increase in the surface area of the fat globules ties up a proportionately greater amount of water in wetting the increased fat globule surface area, it is readily apparent that effective homogenization is a very important factor in forming a solid, plastic, sour cream body. By "plastic" as used in this disclosure is meant a soft or pliable solid or semisolid, capable of being molded, stirred, or spread; such as softened butter, cheese spreads, sour cream, clay, putty, etc. It might be termed the intermediate stage between a viscous liquid and a rigid solid.

Weak body characteristics in sour cream are due to some peculiarity of the cream rather than the equipment used in preparing the cream. For example, the weak body might be due to a chemical change in the salt balance of the milk, the physical characteristics of the butterfat, or the agitation of the milk and cream previous to its being processed to make sour cream. It has been definitely established that the cream that gives weak-bodied sour cream does not homogenize effectively, and usually produces excessive fat clumping during preparation.

When cream is homogenized, the fat is broken up into small globules of approximately one micron or less in diameter. These small fat globules may become regrouped in the form of clumps like clusters of grapes. These clumps may be very small (only a few microns in diameter) with the individual fat globules very much defined and exhibiting their own individual surface area. Such clumping does not seriously impair the body of the sour cream. On the other extreme, there may be very large clumps, approaching 50 to 100 microns in size, in which the individual globules are so tightly packed they largely lose their individuality, and the surface area is that of the clump rather than the combined surface of the individual globules. Extensive fat clumping of the latter type prevents cream from coagulating and thickening, and developing the desired set and heavy plastic body after complete preparation.

It has now been discovered that caseinates, lecithin and monodiglycerides are very effective in eliminating the homogenization problem.

Casein has been used as an emulsifying agent since primitive times, and this particular property is well known. The novelty of the present use of sodium caseinate is not in its emulsifying ability. A very fine emulsion already exists in the cream, and when homogenized it is a very classical example of a fine stable emulsion. However, certain creams have the property of being difficult to homogenize effectively, in spite of the very fine emulsion. Sodium caseinate acts as an aid in promoting the effective homogenization of these creams. Albumin and gelatin are classed on a par with casein in emulsifying properties, yet both of these products are ineffective in promoting effective homogenization of difficult to homogenize creams.

In this specification and in the claims, the word "caseinate" means any of the following compounds: (1) sodium caseinate, (2) calcium caseinate, (3) potassium caseinate, (4) acid casein, (5) ammonium caseinate, or mixtures thereof.

Caseinate, lecithin (phospholipids), and mono- and diglycerides of unsaturated fatty acids (such as oleic acid, linoleic, etc.) are agents found reliable in promoting the effective homogenization of difficult-to-homogenize creams. It would seem logical that any of the other known chemical emulsifying agents would be effective, but they are not. Mono- and diglycerides, and sorbitan esters of saturated fatty acids are excellent emulsifying agents in most applications, but in this application they actually make the homogenization less effective. The partially unsaturated fatty acid esters (iodine value of 20–50) of these compounds vary, some giving very slight improvement and others no improvement at all. The saturated fatty acid esters of acetylated tartrated mono- and diglycerides are ineffective. The unsaturated fatty acid esters of these compounds are rather effective but considerably less effective than lecithin or mono- and diglycerides of oleic acid. Of the long list of recognized emulsifying agents available, caseinates (sodium, calcium, potassium, ammonium, acid casein), lecithin, and mono- and diglycerides of unsaturated fattty acids were found distinctly most effective in promoting effective homogenization in difficult-to-homogenize cream.

When sodium caseinate is used as an emulsifying aid in sour cream, it is preferred to use at least 0.25 percent and about 0.50 percent by weight provides optimum results. About 0.10 percent being the lowest level that will do any measurable good. Above a level of about 2.0 percent sodium caseinate, the resulting sour cream is very grainy and lumpy. Sodium caseinate alone is not a foolproof answer for the problem of difficult-to-homogenize cream in all cases. It is the answer in many cases, and is a pronounced help in practically all cases, but in some cases sodium caseinate alone does not completely correct the difficulty.

Lecithin and other phospholipids are very effective emulsifying aids. Lecithin is probably more effective than sodium caseinate in correcting difficult-to-homogenize cream. It requires about 0.50 percent to 0.75 percent lecithin to be completely effective and foolproof in all sorts of cream. However, lesser amounts are helpful. Even as little as 0.10 percent lecithin gives beneficial results. Lecithin is prone to give off flavors in sour cream, and when more than about 0.25 percent is used, a pronounced off flavor is produced. When lecithin is added to troublesome cream in a concentration of approximately 0.250 percent, the cream homogenizes without serious clumping. The addition of both lecithin and casein greatly improves the effectiveness of the sour-cream preparation and eliminates all homogenization problems.

Mono-diglycerides of unsaturated fatty acids are comparable to lecithin in promoting effective homogenization. As little as 0.25 percent gives noticeable improvement and the use of 0.50 is usually all that is required to correct faulty homogenization. As little as 0.10 percent, by weight, provides some beneficial effects. Mono- and diglycerides of unsaturated fatty acids are rather free from undesirable flavors and in this respect are preferable to lecithin. They are most effectively applied in combination with casein or caseinates.

Pure monoglycerides or pure diglycerides are not readily obtainable since these two materials are substantially inseparable. The conventional and commercially available glycerides are referred to as mono diglycerides and normally contain from approximately 30 to 45 percent monoglycerides, 40 to 60 percent diglycerides, 1 to 5 percent triglycerides and traces of glycerine and free fatty acids. Although, the commercially available mono diglycerides of unsaturated fatty acids are particularly amenable to the method of the present invention, mono diglycerides of unsaturated fatty acids of proportions falling outside the scope of normal commercial grades are not excluded.

To reconcile these results with known facts, it is known that the emulsion system of milk consists of fat globules containing lecithin with the hydrophilic portion of the lecithin molecule oriented at the surface of the fat globules where it exerts a considerable attraction for the water phase of the mix. In addition, a chemical bond is formed between the lecithin and the milk proteins so that the hydrophilic characteristics of the lecithin are greatly enhanced. In addition, proteins are absorbed on the surface of the fat globules forming a fat globule membrane that aids in keeping the fat globules emulsified and dispersed in the aqueous phase. In addition, negative ions from the solution are adsorbed on the fat globule surface, setting up an electrostatic force between the fat globules to further aid in maintaining the butterfat dispersion.

When the cream is homogenized, the surface area of the fat globules is increased up to a hundredfold. This great increase in the surface area of the fat globules requires additional emulsifying agent to effectively emulsify the fat in the form of the smaller fat globules. Therefore, in the usual process of homogenizing cream testing 18–20 percent butterfat, there is a definite shortage of emulsifying material so that obtaining effective homogenization without clumping becomes critical. When all factors are favorable, the homogenization process is performed effectively, and the fat globules are reduced without serious clumping. When one or more of the factors favoring effective homogenization are adverse, the homogenization process does not do an effective job and the resulting cream will give a sour cream with a weak body.

It is known that freezing and excessive agitation causes a transfer of lecithin from the fat globules to the aqueous phase of the cream where it loses most of its effectiveness in emulsifying the fat. The process of making butter utilizes the principle of agitation to remove some of the lecithin from the fat globules, which aids in breaking the emulsion so that the fat globules coalesce in the form of butter. It is believed that most of the creams which cannot be homogenized effectively have undergone some previous treatment, such as freeznig or excessive agitation in processing, so that a significant portion of the lecithin has been removed from the fat globules. As a result, the effective amount of emulsifying agent available to emulsify the fat globules during homogenization is inadequate. Adding lecithin to the cream before homogenization compensates for this deficiency and permits effective homogenization. The fact that soy bean lecithin is chemically very similar to the lecithin occurring naturally in milk, and that lecithin differs from other emulsifying agents in that it is an ionic emulsifier, suggests that the ionic characteristics of the emulsifier is an important function.

The preparation of a cultured sour cream usually involves the steps of cooling pasteurized cream to a temperature of between about 65° F. and 80° F. and then adding about one to three percent, by weight, of a bacterial starter culture. The starter culture comprises a mixture of lactic-acid-producing bacteria, together with flavor- and aroma-producing bacteria. This starter culture is thoroughly mixed with the cream, and the mixture is allowed to stand undisturbed for a period of from 12 to 24 hours. At the end of the standing period, the pH of the cream is in the range of from 4.0 to 4.8.

The process for producing cultured dairy products has numerous shortcomings: Fermentation by a mixed culture of bacteria is difficult to control accurately. If the lactic-acid-producing bacteria are too active, they will tend to kill off the flavor-producing organisms. If the lactic acid production is too slow, the flavor bacteria do not function effectively, and the product will be lacking in both flavor and acidity. As a result, even with the best quality control, there are occasions when the acid development is too high or too low, resulting in a product with poor flavor, making the product tend to vary from day to day. Even when the lactic-acid-producing bacteria function perfectly, the flavor-producing strains of bacteria may be unpredictable in their growth and production of flavor. The presence in the milk being treated of minute traces of penicillin, or other antibiotics used in treating bovine mastitis, exerts a serious inhibiting action on the entire bacterial culture and can be diasastrous to on the final product. In addition, lactic-acid-forming bacteria are subject to attack by bacteriophage which result in lysis of these cultures. Consequently, a mixture of phage-resistant strains must be used. The fermentation process requires a long time period, i.e., 12 to 24 hours, from start to finish. Important equipment is monopolized by the fermenting products until the desired degree of acidity is attained. Because of this long period of standing, batch-type methods must be used in producing cultured products. The process is not amenable to continuous operation and automation techniques. Further, bacterial starter cultures are cumbersome and costly to maintain. Moreover, a producer of larger quantities of cultured dairy products is required to maintain his own starter cultures if he hopes to maintain any control whatsoever over quality and consistency in his final products.

Thus, there has been a need in the art for a new process that will circumvent all or some of the aforementioned difficulties in the fermentation process.

To date, attempts to replace the bacterial fermentation step of the process with other techniques and yet to produce similar products have been unsuccessful. The addition of acid directly to cream instead of permitting bacteria to produce the desired acidity has resulted in separation of the cream into a layer of curd and a layer of whey. Moreover, it has not been possible, prior to the present invention, to obtain a flavor in the end product that is representative of the flavor of the products produced by bacterial fermentation.

It is an object of this invention to provide a new process for preparing sour cream that will substantially reduce the time required for the preparation of similar products.

It is a further object of this invention to provide a new process that will produce sour cream of consistent and uniform quality and which will possess improved storage stability.

It is another object of this invention to provide a new process for preparing sour cream wherein an acid is added directly to cream to prepare the desired products.

Another object of this invention is to provide a process for preparing sour cream wherein a stabilizer is added to cream to prevent premature coagulation upon addition of an edible acid.

Another object of this invention is to provide a process for preparing sour cream wherein a homogeneity stabilizer is added to cream to achieve homogeneity of the sour-cream product.

Other objects and many attendant advantages of the invention will become apparent to those in the art when considered in connection with the following detailed description thereof.

The process of this invention, although basically simple, has not heretofore occurred to dairymen and others skilled in the art. Consequently, comparatively time-consuming and antiquated methods are still being practiced in the dairy industry.

In general, the present invention relates to an improvement in my direct-acid process for making sour cream. In the process of my aforementioned patent applications, acid stabilizers in the form of colloid formers are added to cream prior to coagulation caused by direct-acid additions. The improvement consists of also adding one or more of the homogenizing stabilizers caseinates, lecithin and monodiglycerides of unsaturated fatty acids prior to coagulation. The colloid formers or acid stabilizers prevent premature and uneven coagulation (uneven curd and whey separation) while the homogeneity stabilizers provided a greatly improved textured (nonstringy, firm but plastic) body to the sour-cream product.

The basic raw material is, of course, cream which usually contains about 18 percent, by weight, butterfat. The butterfat content is not critical and may well exceed 18 percent depending on the quality of product being made. Cream containing as little as 10 percent butterfat and as much as 30 percent butterfat are well within a workable range for making sour cream by the direct-acid process.

When the cream starting material has been selected, it may then be stabilized prior to the acid addition. The sequence of stabilization is of no consequence, that is the acid stabilizer may be mixed with the cream either before or after the homogeneity stabilizing addition. I have found it to be expedient to mix the stabilizing ingredients along with any flavoring agents that are to be included and introducing all of the ingredients simultaneously.

As has been amply set forth above, the homogeneity stabilizers of the present invention are caseinates, lecithin and mono diglycerides of unsaturated fatty acids. In my copending patent application, a satisfactory range of from about 0.10 to 1.00 percent, by weight, of any one or any combination of the above specified is set forth. It has now been determined that while as little as 0.10 percent of the homogeneity stabilizers may have some beneficial effect on the resulting sour-cream product at least 0.25 percent, by weight, is preferred. Also, it has now been determined that more than 1.00 percent, by weight, and up to 2.00 percent, by weight, of the homogeneity stabilizers can be successfully employed. Consequently, a preferred range of the homogeneity stabilizers is from about 0.25 to 2.00 percent, by weight.

The acid stabilizer may be any material capable of forming a colloidal suspension within the cream and, as set forth in my aforementioned copending patent application, is added within the range of from 0.05 percent to 1.0 percent, by weight. The preferred acid stabilizers are the hydrophilic colloids such as gelatin, locust bean gum, guar gum, agar, Danish agar, cellulose gum, carrageenin, gum tragacanth, and gum arabic. Many other colloid-forming agents may also be employed including proteins which promote syneresis such as the enzymes rennin and pepsin so long as the acid additions are made before syneresis (coagulation) takes place. Locust bean gum, guar gum, and mixtures thereof are preferred in preparing a sour-cream product.

In adding stabilizing agents to the cream, it is important that the stabilizing agents be thoroughly mixed and uniformly dispersed throughout the cream. Thus, while the stabilizers are being added, the cream should be vigorously agitated. Sufficient time should be allowed for the stabilizers to become thoroughly and uniformly dispersed. For some products, it may also be desirable to add a body-improving agent at the same time that the stabilizers are being added to the cream. An inactive bulking agent can be used, such as sugar, cerelose, soluble albumin, or common salt. The body-improving agent when used is added in an amount in the range of 0.1 to 2.0 percent by weight. Best results are generally obtained when about 0.5 percent by weight is used.

After the acid and homogeneity stabilizers have been added to the cream, it may be pasteurized in the conventional manner. The pasteurization temperatures employed in the preparation of the cream prior to acidification are those conventionally used for this purpose, and preferably range between about 143° F. and about 205° F.

The pasteurization step is followed by homogenization treatment in a conventional manner. Cultured sour cream is generally homogenized. Homogenization has no adverse effect on the practicing of this process.

Following pasteurization and homogenization, the cream is cooled to a temperature ranging from about 40° F. to about 80° F., and is ready for the acidification step. Any conventional cooling method may be employed. Caution, of course, must be exercised not to freeze the cream, since de-emulsification would occur under those conditions.

In my aforementioned copending patent application it is stated that following pasteurization and homogenization, the cream is cooled to a temperature ranging from about 65° F. to about 75° F. and is then ready for the acidification step. It has now been found that although the range of 65° F. to 75° F. is operable it is not critical. Acidification may take place at any temperature above the freezing point of the milk and below its pasteurization temperature but will preferably take place within the temperature range of from about 40° F. to 80° F.

Stabilized and pasteurized cream is acidified by adding thereto, with agitation, a sufficient amount of an edible acid to cause coagulation. Such coagulation will generally occur at a pH of from about 3.7 to 5.0 depending on temperature, the presence or absence of enzymes etc. The acid may be added as a liquid or a solid and any means of adding such materials may be employed. Further, the edible acid added can be either organic or inorganic, from a chemical classification standpoint. Since a foodstuff is prepared, it is essential that the acid employed be edible. It is also desirable that the edible acid used impart tartness and flavor to the product similar to that found in the analogous cultured products. Thus, while some edible acids would work in the process, the end product might have a flavor that would be different from the analogous cultured product. While this flavor may be different, there may be many people who would find it preferable. Among the edible acids that provide the degree of tartness and flavor associated with cultured products are the following: citric acid, lactic acid, tartaric acid, adipic acid, fumaric acid, orthophosphoric acid, pyrophosphoric acid, and acetic acid. Other edible acids which may be used in this process are hydrochloric, succinic, malic and gluconic acids. Of course, lactic acid is preferred for most appliations, since it is the acid produced by the bacteria used in the cultured process.

Preferably the acid addition will be of such a concentration as to not exceed about 5 percent of the weight of the cream. For the purpose of the present specification and claims, the meaning of the word "acid" and the term "edible acid" shall include materials that are capable of acidifying milk without undue dilution and which will not render the product deleterious to human consumption in the quantities it is employed. For example, acidogens such as D-glucono-delta-lactone can be employed as the acid addition.

The homogeneity stabilizers of the present invention, as stated above, are particularly effective in preventing clumping of finely divided (homogenized) butterfat globules and consequently are most effective when utilized in conjunction with homogenized cream. Homogenization is normally effected after the stabilizers have been added (both acid stabilizers and homogeneity stabilizers). We have recently found that when the stabilizers are added to cream before homogenization, it occasionally interferes with the effective homogenization of the cream and results in a weak-bodied sour cream. When this problem is experienced, it may be completely eliminated by homogenizing the cream before the stabilizers are added. In practice, either stabilizer (acid or homogeneity) may be added before or after homogenization (and/or pasteurization).

In practicing this process, the acid is added in powdered crystalline form, or as an aqueous solution of the acid. In the case of lactic acid, the commercially available 85 percent food grade has been found to be very effective. While the general pH range for the products is about 3.7 to about 5.0 best results are obtained when the pH is in the range of about 4.0 to about 4.7.

In my copending patent application, titratable acidity is described as an essential element in the direct-acid process. However, it has now been determined that pH measurements alone are an adequate criteria for determining a desirable acidity for cream coagulation.

Where it is desired to increase the viscosity of products prepared by this process, there can also be added, preferably with the acid, a proteolytic enzyme in a relatively small amount. Enzymes, such as rennet or pepsin, are suitable. When rennet is used, only about 0.1 to about 5 cc. of commercial solution per 100 gallons of cream is needed. The use of a proteolytic enzyme causes an increase in viscosity and possibly also increased coagulation. The viscosity increase and the extent of coagulation can be regulated quite accurately by (1) varying the amount of enzyme used (increasing the enzyme increases the viscosity and amount of coagulation and vice versa); (2) varying the pasteurization temperature (temperatures above 145° F. reduce the viscosity and amount of coagulation); (3) adding polyvalent cations, such as calcium chloride, or calcium carbonate increases the viscosity and amount of coagulation; and (4) adding polyvalent anions, for example phosphate ions in the form of sodium dihydrogen phosphate, decreases the viscosity and amount of coagulation.

Where it is desired that the taste of the final product closely resemble the taste of the analogous product prepared by the fermentation method, it will help to add as a flavoring agent, following acidification, a small amount of starter distillate. Starter distillate is a standard commercial product, liquid in form, which is widely used by dairy processors to add flavor to butter, margarine, and cheese, and to fortify the flavor of cultured buttermilk and other dairy products. Its principal constituent is diacetyl. It also contains small amounts of butyric, propionic and acetic acids as flavor constituents. It no doubt contains traces of many other volatile compounds. However, a complete analysis of starter distillate has never been made.

Starter distillate is a liquid made by steam distillation of a well-ripened starter or buttermilk. It contains the volatile flavor constituents produced by the microorganisms in cultured buttermilk. In the manufacture of starter distillate, the distillate is usually standardized to a definite diacetyl content. Since diacetyl is the principal flavor constituent, it is assumed that, by standardizing the product to a definite diacetyl content, the other flavor constituents will also be fairly accurately standardized. When using a standard commercial single-strength starter distillate, the desired flavor effect is achieved when the starter distillate reaches a concentration of about 0.05 percent to about 0.50 percent, by weight, of the cream.

Where it is desired to more closely achieve the flavor of an analogous cultured product, it is also necessary to add carbon dioxide to the product. Carbon dioxide is produced by bacteria in the fermentation method. It is generally known that carbon dioxide is produced by the flavor-producing bacteria, but it has not been recognized that the carbon dioxide itself is an essential constituent of the complex flavor components of a product of this type. Thus, where carbonation of the product is desired, it has been found necessary to bring the carbon dioxide concentration in the product to the range of about 100 to 3,000 parts per million. While it has been found that a carbon dioxide content of about 1500 parts per million enhances the flavor of sour cream, taste panel results have indicated that carbon dioxide ($CO_2$) is not essential to prepare sour cream that meets with high taste-panel approval. If desired, $CO_2$ may be added by direct carbonation of the acidified cream, or by addition of a salt, such as calcium carbonate or sodium carbonate which will liberate carbon dioxide when in contact with an acid.

It was found that the inclusion of calcium carbonate in the stabilizer and the addition of sufficient acid to completely neutralize the calcium carbonate and liberate the $CO_2$ is a convenient way of producing the high flavored cultured sour cream. As an example, 0.20 percent calcium carbonate was added to the cream along with the stabilizer before pasteurization. The cream was then pasteurized, homogenized, and cooled in the usual way. The solution of acid-starter distillate contained sufficient additional acid to supply an additional 0.60 percent lactic acid to the cream. This additional lactic acid completely neutralized the calcium carbonate and liberated the $CO_2$. The sour cream contained approximately 800 parts per million of $CO_2$ in addition to the normal acid and volatile flavor constituents and had the full acidity and aroma of a well-ripened sour cream.

After these steps the sour cream is ready for packaging. Conventional containers may be employed. After packaging, the sour cream is held under refrigeration until consumed. Sour cream made by this process has a very low bacterial count, usually less than 30,000 per cc., as contrasted with cultured sour cream which usually has a bacterial count of several million per cc. The noncultured sour cream product of this process is characterized by having a bacterial count comparable to that of pasteurized milk.

In the above discussion, the process and products therefrom were described in general terms. Specifically, a product superior and analogous to cultured sour cream can be prepared. In processing a sour-cream-type product by this process, as compared to the fermentation method, (1) more accurate control over the plasticity and spreadability of the sour cream is possible; (2) whey separation can be completely eliminated, and (3) the product can be pumped by conventional techniques into the final package. Cultured sour cream cannot be agitated or pumped after it is cultured, without excessive loss of viscosity and danger of whey separation. In the fermentation process, cream is inoculated with a starter culture of bacteria, and then packaged. It is held at about 72° F. for about 15 to 24 hours to permit fermentation to occur within the package. It is obvious that this process does not permit accurate and effective quality control. By the process of this invention, stabilizers are added, under agitation, to cream. The cream used may contain the conventional 18 percent butterfat or a so-called half-and-half (milk-cream) may be used, which contains about 11.5 percent butterfat and 11.0 percent milk solids-not-fat. The cream and stabilizers mixture is then pasteurized and homogenized by conventional techniques. Next, the mixture is cooled to about 68° F. Edible acid is added until a pH of about 4.40 and a titratable acidity of about 0.50–1.40 percent by weight of lactic acid are reached. Starter distillate is then added for flavoring purposes. If desired, the product can also be carbonated at this time. As pointed out above, while carbonation is not necessary to achieve a product of good taste and flavor, these properties are enhanced by a carbon dioxide content of approximately 500–1500 parts per million. The product is then packaged and stored at 40° F. The processing time to prepare this product is of the order of only one-half to three-quarters of an hour, and may be processed continuously.

It was also found by using this process including the same material ratios, that it was possible to prepare a sour cream which had a shelf life of about one month at room temperature. This was accomplished by pasteurizing the cream (same type as above) with the dissolved stabilizers at about 143° F. for approximately 30 minutes. Then immediately before the cream could cool it was homogenized and agitated well, at which time the edible acid was added as done above, and the sour cream was then packaged while it was still hot. A partial vacuum was placed on the sour cream in each packaged unit. The sour cream prepared in this manner had a room temperature (about 72° F.) shelf life of about one month without any signs of spoilage.

*Example 1*

A mixture of stabilizers was initially prepared. This mixture consisted of 0.760 pound of tapioca starch, 0.203 pound of guar gum, and 0.304 pound of lecithin. This mixture of stabilizers was slowly added into 100 pounds of cold raw cream (18 percent or more butterfat) which was being vigorously agitated. Then, after allowing a few minutes for the stabilizing agents to become dispersed, the solution was heated to 175° F. and homogenized at 2500 pounds pressure. The temperature was then reduced to approximately 65–75° F. and 0.45 pound of 85 percent food grade lactic acid and 0.20 pound of starter distillate were then added.

The amount of lactic acid was adjusted so as to obtain a pH of 4.50 and titratable acidity in weight percent of lactic acid in the range of about 0.50 to 1.40 percent. The sour cream was then bottled and held under refrigeration until consumed. The product had a very low bacterial count, and possessed excellent keeping quality. Rennet could have been added to give a firmer and dryer body to the sour cream.

*Example 2*

A mixture of stabilizers was prepared initially which consisted of 0.203 pound of guar gum, 0.761 pound of tapioca starch, and 0.507 pound of sodium caseinate. This mixture of stabilizers was slowly added into 100 pounds of cold raw cream (18 percent or more butterfat) which was being vigorously agitated. A few minutes were allowed for the stabilizing agents to become dispersed and then the mixed solution was heated to 175° F., and then homogenized in the usual way at 2500 pounds pressure. After homogenization, the stabilized cream was cooled to approximately 65–70° F. A 50 percent solution of lactic acid (85 percent food grade lactic acid) was then added in sufficient quantity to give the cream an acidity of 0.50–1.40 percent. Also added was 0.20 pound of starter distillate to produce a culture flavor. (The amount of starter distillate can be varied from 0.05 to 0.50 weight percent to reach a desired flavor.) The sour cream was then thoroughly stirred, packaged, and stored in a refrigerator overnight. The following morning it was cooled, set, and ready for marketing. Rennet, if desired, could have been added to give a firmer and dryer body to the sour cream.

*Example 3*

A mixture of stabilizers was prepared consisting of 0.203 pound of guar gum, 0.761 pound of tapioca flour, 0.355 pound sodium caseinate, and 0.152 pound of lecithin. This mixture was then slowly added to 100 pounds of cold raw cream (18 percent or more butterfat) which was being vigorously agitated.

The cream was then processed and set as described in Example 1.

*Example 4*

A mixture of stabilizers consisting of 0.203 pound of guar gum, 0.761 pound of tapioca starch, 0.350 pound of sodium caseinate, and 0.220 pound of mono- and diglycerides of unsaturated fatty acids was initially prepared. This mixture was then slowly added to 100 pounds of well agitated, hot (about 143° F.) raw cream (18 percent or more butterfat) and then pasteurized either at about 143° F. for 30 minutes or by high temperature short time (HTST) methods (161–280° F. for 1–30 seconds) or equivalent time temperature cycles and homogenized before it could cool off. 0.45 pound of 85 percent food grade lactic acid or equivalent amounts of other edible acids were added to the well adjusted still hot stabilized cream solution.

The amount of acid was adjusted so as to obtain a pH of between about 4.0–4.7 and a titratable acidity in weight percent of lactic acid in the range of about 0.50–1.40 percent. The sour cream was packaged under a partial vacuum while still hot as soon as the required pH and acidity factor were obtained with the acid. The packaged cream was stored at room temperature (approximately 72° F.) for a month without any sign of spoilage.

*Example 5*

A mixture of stabilizers was prepared consisting of 0.200 pound of guar gum, 0.750 pound of tapioca flour, 0.350 pound of sodium caseinate, and 0.250 pound of mono- and diglycerides of unsaturated fatty acids. This mixture was then slowly added to 100 pounds of cold raw cream (18 percent or more butterfat) which was being vigorously agitated.

The cream was then processed and set as described in Example 1.

A new useful product and process have been disclosed. However, it will be understood from the foregoing specification and examples that the invention described and claimed herein is susceptible of many variations and modifications and that all such modifications are within the spirit and scope of the invention and the claims thereto.

What is claimed is:

1. A direct-acid process for coagulating cream in the production of non-cultured sour cream comprising:
   (A) mixing acid stabilizers and homogeneity stabilizers with cream prior to coagulation,
      (1) said acid stabilizers consisting of from 0.05 to 1.00 percent, by weight, of at least one colloid-forming material selected from the group of gelatin, locust bean gum, guar gum, agar, Danish agar, cellulose gum, carrageenin, gum tragacanth and gum arabic,
      (2) said homogeneity stabilizer consisting of from about .25 to 2.00 percent, by weight, of at least one material selected from the group of caseinates, lecithin, and monodiglycerides of unsaturated fatty acids;
   (B) pasteurizing and homogenizing; and thereafter
   (C) adding an edible acid to said cream sufficient to bring about coagulation while agitating.

References Cited

UNITED STATES PATENTS

| | | | |
|---|---|---|---|
| 1,661,601 | 3/1928 | Dahlberg | 99—116 |
| 1,815,727 | 7/1931 | Reynolds et al. | 99—59 X |
| 2,407,027 | 9/1946 | Mason et al. | 99—63 |
| 2,853,386 | 9/1958 | Hughes | 99—54 |
| 3,066,027 | 11/1962 | Perini et al. | 99—60 |

FOREIGN PATENTS 677,531  8/1952  Great Britain.

LIONEL M. SHAPIRO, *Primary Examiner.*

Disclaimer 3,370,955.—*Lawrence L. Little*, Creve Coeur, Mo. PROCESS FOR MAKING ACIDIFIED PRODUCTS. Patent dated Feb. 27, 1968. Disclaimer filed Mar. 21, 1977, by the assignee, *The Battelle Development Corporation*.

Hereby enters this disclaimer to claim 1 of said patent.

[*Official Gazette May 24, 1977.*]